US008719370B2

(12) United States Patent
Lu et al.

(10) Patent No.: US 8,719,370 B2
(45) Date of Patent: May 6, 2014

(54) METHOD AND SYSTEM FOR TRANSMITTING LARGE MESSAGE MODE CONVERGED IP MESSAGING (75) Inventors: Yan Lu, Shenzhen (CN); Ghazanfar Ali, Shenzhen (CN); Lizhe Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 298 days.

(21) Appl. No.: 13/257,899

(22) PCT Filed: Nov. 26, 2009

(86) PCT No.: PCT/CN2009/075163
§ 371 (c)(1),
(2), (4) Date: Dec. 14, 2011

(87) PCT Pub. No.: WO2010/145121
PCT Pub. Date: Dec. 23, 2010

(65) Prior Publication Data
US 2012/0166579 A1 Jun. 28, 2012

(30) Foreign Application Priority Data
Jun. 17, 2009 (CN) .......................... 2009 1 0150440

(51) Int. Cl.
G06F 15/16 (2006.01)
(52) U.S. Cl.
USPC ...................................................... 709/217
(58) Field of Classification Search
None
See application file for complete search history.

(56) References Cited

U.S. PATENT DOCUMENTS 8,010,616 B2 * 8/2011 Lee et al. ...................... 709/206
8,171,092 B2 * 5/2012 Lee et al. ...................... 709/206
8,176,134 B2 * 5/2012 Lee et al. ...................... 709/206
(Continued)

FOREIGN PATENT DOCUMENTS

CN 101448008 A 6/2009
EP 2028807 A1 2/2009
WO 2009045061 A2 4/2009

OTHER PUBLICATIONS

Supplementary European Search Report in European application No. 09846035.5, mailed on May 16, 2013.
(Continued)

Primary Examiner — Brian P Whipple
(74) Attorney, Agent, or Firm — Oppedahl Patent Law Firm LLC (57) ABSTRACT The present invention provides a method and system for transmitting a large message mode CPM message. A MSRP link is created respectively between a CPM client at a sending end and a participating function entity at a source end, between the participating function entity at the source end and a CPM control function entity, and between the CPM control function entity and an inter-working function entity based on a media negotiation process before the CPM client transmits a large message mode CPM message to a non-CPM system receiver in a target group; then, the CPM client at the sending end sends the contents of the large message mode CPM message to the inter-working function entity through each created MSRP link sequentially; and the inter-working function entity sends the received contents of the large message mode CPM message to the non-CPM system receiver after performing protocol conversion on the received contents. The method and the system solve the problem that a large message mode CPM message cannot be transmitted to a group in the prior art and the user experience is improved.

18 Claims, 1 Drawing Sheet

(56) References Cited

U.S. PATENT DOCUMENTS

| | | | | |
|---|---|---|---|---|
| 8,312,094 | B2* | 11/2012 | Lee et al. | 709/206 |
| 8,516,051 | B2* | 8/2013 | Lee et al. | 709/204 |
| 2009/0052455 | A1 | 2/2009 | Kim | |
| 2009/0216725 | A1* | 8/2009 | Yaqub | 707/3 |
| 2010/0128666 | A1* | 5/2010 | Masson et al. | 370/328 |
| 2010/0185740 | A1* | 7/2010 | Lee et al. | 709/206 |
| 2010/0185741 | A1* | 7/2010 | Lee et al. | 709/206 |
| 2011/0208830 | A1* | 8/2011 | Haruna et al. | 709/217 |
| 2012/0084377 | A1* | 4/2012 | Lee et al. | 709/206 |

OTHER PUBLICATIONS

OMA Converged IP Messaging System Description; Mar. 12, 2009.
The Message Session Relay Protocol (MSRP); Sep. 1, 2007.
SD—Large Messaging Mode Interworking Flow; Apr. 10, 2009.
Converged IP Messaging Architecture; Oct. 4, 2007.
International Search Report in international application No. PCT/CN2009/075163, mailed on Mar. 25, 2010.
English Translation of the Written Opinion of the International Search Authority in international application No. PCT/CN2009/075163, mailed on Mar. 25, 2010.
3G IMPS Realization Technologies Dec. 2007.

\* cited by examiner

METHOD AND SYSTEM FOR TRANSMITTING LARGE MESSAGE MODE CONVERGED IP MESSAGING

TECHNICAL FIELD OF THE INVENTION

The present invention relates to the technical field of mobile communications, in particular to a method and system for transmitting large message mode converged IP messaging.

BACKGROUND OF THE INVENTION

The Open Mobile Architecture (OMA) put forward Converged IP Messaging (CPM) in 2005, in order to realize the inter-working of multiple messaging services, provide a unified messaging service and perfect, consistent and convenient messaging service experience. The CPM converges multiple existing messaging services, comprising Instant Message (IM), Push-To-Talk over Cellular (POC), Mobile E-Email (MEM), Short Messaging Service (SMS), Multimedia Messaging Service (MMS), etc.

At present, the OMA is specifying CPM V1.0. The CPM may be in the following service modes: pager-mode based CPM, session-mode based Large Message Mode CPM, and other session based CPM session services. Before normally using these services, a user needs to log in to a CPM system, i.e., generally called "online".

A Session Initiation Protocol (SIP) message is adopted to transmit a pager-mode message between a CPM Client and a CPM Enabler which are respectively at sending and receiving ends. The sender cannot use a SIP message for carrying a large message mode CPM message whose size exceeds a limit (for example, over 1300 bytes) when needing to send such a CPM message.

A CPM user can send a CPM pager message to a CPM Ad-hoc group or a CPM Pre-defined group but cannot use a SIP message for carrying such CPM pager message when the size of this message exceeds a certain limit.

In the existing specifications, the solution of sending a large message mode CPM message to a non-CPM system user (i.e. non-CPM user) in an ad-hoc group or a pre-defined group has not been provided yet.

SUMMARY OF THE INVENTION

The technical problem to be solved by the invention is to provide a method and system for transmitting a large message mode CPM message, in order to solve the problem that a CPM client cannot send a large message mode CPM message to a receiver in a non-CPM system, such as a SMS system, a MMS system, an Email system and the like in a group.

In order to solve the above-mentioned problem, the technical solution of the invention is implemented as follows.

A method for transmitting a large message mode CPM message, comprising: creating a MSRP link respectively between a CPM client at a sending end and a participating function entity at a source end, between the participating function entity at the source end and a CPM control function entity, and between the CPM control function entity and an inter-working function entity before the CPM client sends a large message mode CPM message to a non-CPM system receiver in a target group, wherein a creator of each MSRP link acquires MSRP information of an opposite end through a media negotiation process and implements the creation of the MSRP link according to the MSRP information; then, the CPM client at the sending end sends contents of the large message mode CPM message to the inter-working function entity through each created MSRP link sequentially; sending the received contents of the large message mode CPM message by the inter-working function entity to the non-CPM system receiver after the inter-working function entity performs protocol conversion on the received contents.

The media negotiation process may be that: the CPM client at the sending end sends a first session invite message, and the participating function entity at the source end receives the first session invite message; the participating function entity at the source end generates and sends a second session invite message, and the CPM control function entity receives the second session invite message; for the non-CPM system receiver in the group, the CPM control function entity generates and sends a third session invite message, and a network selection function entity receives the third session invite message; the network selection function entity selects an inter-working function entity according to the third session invite message and sends a fourth session invite message, and the inter-working function entity receives the fourth session invite message;

the inter-working function entity generates and sends a fourth success response message, and the network selection function entity receives the fourth success response message; the network selection function entity sends a third success response message, and the CPM control function entity receives the third success response message; the CPM control function entity generates and sends a second success response message, and the participating function entity at the source end receives the second success response message; the participating function entity at the source end generates and sends a first success response message, and the CPM client at the sending end receives the first success response message.

The method may further comprise:
generating and sending a first acknowledgement message by the CPM client at the sending end after the CPM client at the sending end receives the first success response message, receiving the first acknowledgement message by the participating function entity at the source end; sending a second acknowledgement message by the participating function entity at the source end after the participating function entity at the source end receives the first acknowledgement message, receiving the second acknowledgement message by the CPM control function entity; sending a third acknowledgement message by the CPM control function entity, receiving the third acknowledgement message by the network selection function entity; sending a fourth acknowledgement message by the network selection function entity after the network selection function entity receives the third acknowledgement message, receiving the fourth acknowledgement message by the inter-working function entity; or, sending a third acknowledgement message by the CPM control function entity after the CPM control function entity receives a third success response message, receiving the third acknowledgement message by the network selection function entity; sending a second acknowledgement message by the participating function entity at the source end after the participating function entity at the source end receives a second success response message, receiving the second acknowledgement message by the CPM control function entity; generating and sending a first acknowledgement message by the CPM client at the sending end after the CPM client at the sending end receives a first success response message, receiving the first acknowledgement message by the participating function entity at the source end.

The MSRP link between the participating function entity at the source end and the CPM client at the sending end may be a first MSRP link;

the first session invite message contains MSRP information of the CPM client at the sending end, then the process of creating the first MSRP link may be that: the participating function entity at the source end creates the first MSRP link according to the MSRP information of the CPM client at the sending end; or the first success response message contains MSRP information of the participating function entity at the source end, then the process of creating the first MSRP link is: the CPM client at the sending end creates the first MSRP link according to the MSRP information of the participating function entity at the source end.

The MSRP link between the CPM control function entity and the participating function entity at the source end may be a second MSRP link;

the second session invite message contains MSRP information of the participating function entity at the source end, then the process of creating the second MSRP link may be that: the CPM control function entity creates the second MSRP link according to the MSRP information of the participating function entity at the source end; or the second success response message contains MSRP information of the CPM control function entity, then the process of creating the second MSRP link is: the participating function entity at the source end creates the second MSRP link according to the MSRP information of the CPM control function entity.

The MSRP link between the inter-working function entity and the CPM control function entity may be a third MSRP link;

the third and fourth session invite messages contain MSRP information of the CPM control function entity, then the process of creating the third MSRP link may be that: the inter-working function entity creates the third MSRP link according to the MSRP information of the CPM control function entity; or the third and fourth success response messages contain MSRP information of the inter-working function entity, then the process of creating the third MSRP link is: the CPM control function entity creates the third MSRP link according to the MSRP information of the inter-working function entity.

If the creator of the first MSRP link is the CPM client at the sending end, the time to create the first MSRP link by the CPM client at the sending end is: after receiving the first success response message;

and if the creator of the first MSRP link is the participating function entity at the source end, the time to create the first MSRP link by the participating function entity at the source end is: after receiving the first acknowledgement message.

If the creator of the second MSRP link is the participating function entity at the source end, the time to create the second MSRP link by the participating function entity at the source end is: after receiving the second success response message, or the first acknowledgement message or a MSRP media transmission request;

and if the creator of the second MSRP link is the CPM control function entity, the time to create the second MSRP link by the CPM control function entity is: after receiving the second acknowledgement message.

If the creator of the third MSRP link is the CPM control function entity, the time to create the third MSRP link by the CPM control function entity is: after receiving the third success response message, or the second acknowledgement message or a MSRP media transmission request;

and if the creator of the third MSRP link is the inter-working function entity, the time to create the third MSRP link by the inter-working function entity is: after receiving the fourth acknowledgement message.

Between the processes of creating the first and second MSRP links, further comprising:

sending a first media transmission request by the CPM client at the sending end, receiving the first media transmission request by the participating function entity at the source end;

the MSRP information of the CPM control function entity is acquired from the second success response message or path header information contained in the first media transmission request;

between the processes of creating the second and third MSRP links, further comprising:

sending a second media transmission request by the participating function entity at the source end, receiving the second media transmission request by the CPM control function entity;

the MSRP information of the inter-working function entity is acquired from the third success response message or path header information contained in the second media transmission request.

The method may further comprise:

returning a receiving acknowledgement message by the non-CPM system receiver to the inter-working function entity after the non-CPM system receiver receives the contents of the large message mode CPM message which were subjected to protocol conversion; and sending a MSRP response message by the inter-working function entity to the CPM control function entity after the inter-working function entity receives the receiving acknowledgement message.

The process of creating a MSRP links may comprise:

a creator implements the creation by initiating a link creation request according to MSRP information of an opposite end;

or, a creator selects an existing MSRP link with a matched host, port and/or MSRP URI as a MSRP link to be created.

Any two of the function entities comprising CPM client at the sending end, the participating function entity at the source end, the CPM control function entity and the inter-working function entity may communicate with each other in any one of the following three manners:

manner 1: all the function entities of said function entities communicate with each other through a SIP/IP core network;

manner 2: partial function entities of said function entities communicate with each other through a SIP/IP core network, and other function entities except the partial ones communicate with one another based on direct communication link between each other or through other relay equipment except a SIP/IP core network; and manner 3: all the function entities of said function entities communicate with one another based on direct communication link between each other or through other relay equipment except a SIP/IP core network.

A system for transmitting a large message mode CPM message comprises a CPM client at a sending end, a participating function entity at a source end, a CPM control function entity and an inter-working function entity, wherein each of the function entities above is arranged for acquiring MSRP information of an opposite end used for creating a MSRP link through a media negotiation process and creating a MSRP link respectively between the CPM client at the sending end and the participating function entity at the source end, between the participating function entity at the source end and the CPM control function entity, and between the CPM control function entity and the inter-working function entity according to the MSRP information;

the CPM client at the sending end is further arranged for sending contents of a large message mode CPM message to the inter-working function entity through each of the created MSRP links sequentially;

and the inter-working function entity is further arranged for sending the received contents of the large message mode CPM message which were subjected to protocol conversion to a non-CPM system receiver.

Among any two of function entities comprising the CPM client at the sending end, the participating function entity at the source end, the CPM control function entity and the inter-working function entity, there is a connection manner in any one of the following three manners:

manner 1: all the function entities of said function entities are connected with each other through a SIP/IP core network;

manner 2: partial function entities of said function entities are connected with each other through a SIP/IP core network, and other function entities except the partial ones are connected with one another directly or through other relay equipment except a SIP/IP core network; and manner 3: all the function entities of said function entities are connected with one another directly or through other relay equipment except a SIP/IP core network.

To sum up, in the method and system of the invention, a media transmission link between a CPM client at a sending end and an Inter-working Function entity (IWF) is created through a session invite message in a large message mode CPM message; and contents of the large message mode CPM message are sent to the IWF through the created media transmission link, then to a non-CPM system side through the IWF and finally to a client at a receiving end through the non-CPM system, so that the problem that a large message mode CPM message cannot be sent to non-CPM system users in a group in the prior art is solved and the user experience is improved.

DETAILED DESCRIPTION OF THE INVENTION

Because occupying a large space, a large message mode CPM message cannot be directly carried by a SIP message, moreover, it is transmitted through a signalling path and a media path, i.e., signalling is transmitted along the signalling path and media is transmitted along the media path, which is different from the transmission manner of a pager-mode CPM message. Therefore, in an embodiment of the invention, when a large message mode CPM message is sent to a target group, for a non-CPM system receiver in a target group, a session invitation message (INVITE) in a large message mode CPM message is arranged for performing media negotiation firstly, and then a media transmission link is created between a CPM client at a sending end and an IWF; through the created media transmission link, the CPM client at the sending end sends contents of the large message mode CPM message to the IWF by using a Message Session Relay Protocol (MSRP) and the IWF forwards the contents to a client at a receiving end.

The so-called large message mode CPM message in the embodiment of the invention is specified by the OMA and exceeds a preset limit (for example, 1,300 bytes) in size in CPM specification, thereby failing to be directly carried by a SIP message.

The preferred embodiment of the invention will be described below with reference to the drawing; it should be understood that the preferred embodiment described here are only used for describing and explaining the invention rather than limiting the invention.

According to the embodiment of the invention, a method for transmitting a large message mode CPM message is provided at first and used for transmitting a large message mode CPM message to a non-CPM system receiver in a target group, specifically, a MSRP link is created respectively between a CPM client at a sending end and a participating function entity at a source end, between the participating function entity at the source end and a CPM control function entity, and between the CPM control function entity and an inter-working function entity before the CPM client sends the large message mode CPM message to the non-CPM system receiver in the target group, wherein a creator of each MSRP link acquires MSRP information (such as connection parameters) of an opposite end through a media negotiation process and creates a MSRP link according to the MSRP information; then, the CPM client at the sending end sends contents of the large message mode CPM message to the inter-working function entity through each created MSRP link sequentially; and the inter-working function entity sends the received contents of the large message mode CPM message to the non-CPM system receiver after performing protocol conversion on the received contents.

In the following embodiment, a CPM client at a sending end is CPM Client A; a participating function entity at a source end to which a sender belongs is Participating Function A; a CPM control function entity in a target group is CPM Control Function X; a network selection function entity is Inter-working Selection Function A (ISF for short); an inter-working function entity is Inter-working Function A (IWF for short); and a selected non-CPM system is non-CPM system B (selected by ISF, such as a selected SMS system or MMS system).

The invention is specifically described below through one embodiment.

Figure 1:
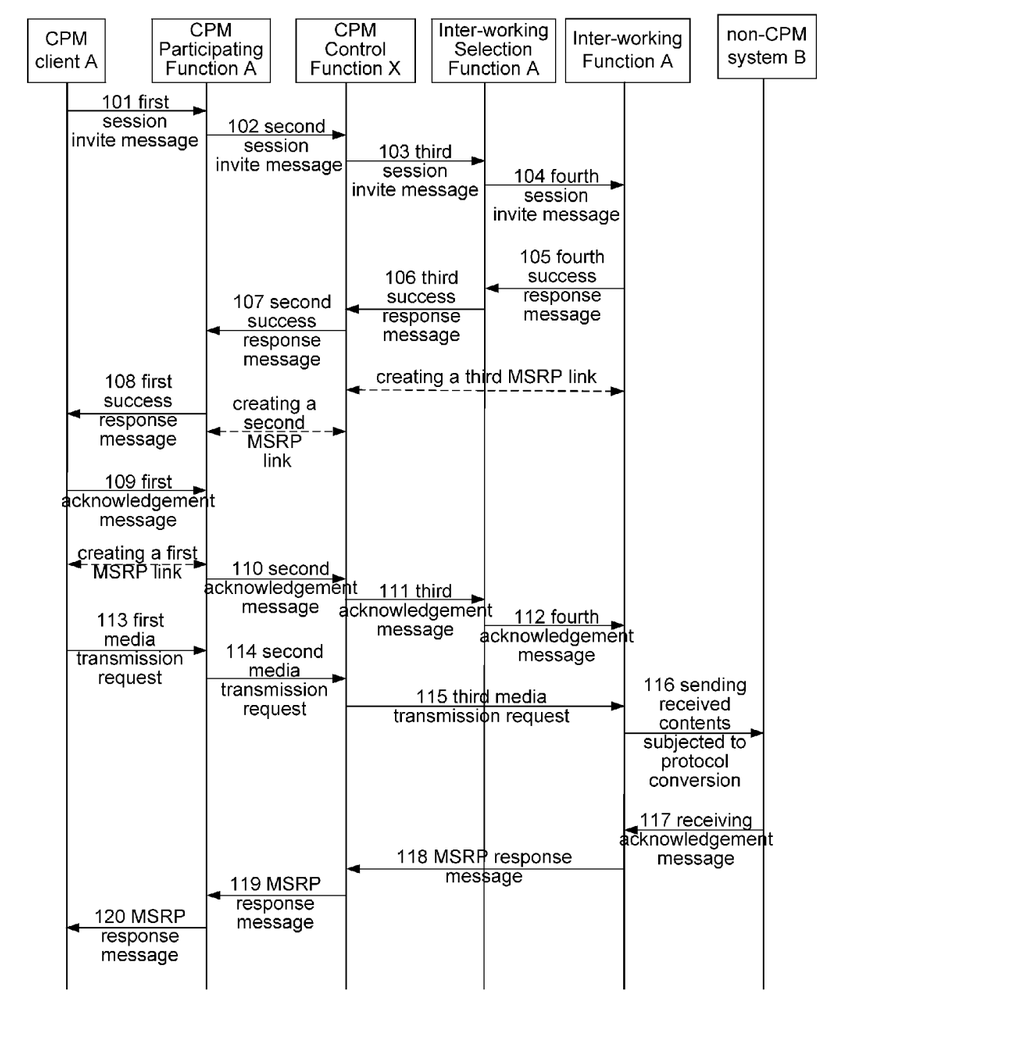
FIG. 1 shows a flow chart of a method for transmitting a large message mode CPM message according to an embodiment of the invention.

FIG. 1 shows a flow chart of a method for transmitting a large message mode CPM message according to an embodiment of the invention, comprising the following steps:

Step 101: CPM Client A sends a first SIP INVITE message (session invitation message) of a large message mode CPM message to a group having one or more non-CPM system users; the session invitation message carries a SDP message used for session negotiation; and the SDP message carries information about the size and content type of media data to be transmitted. The first SIP INVITE message is routed to Participating Function A through a SIP/IP core network.

The SDP message in the first SIP INVITE message may carry MSRP connection parameters of the CPM Client A.

The target group when the CPM Client A sends large message mode CPM message may be an Ad-hoc group or a Pre-defined group; when the target group is an Ad-hoc group, the first SIP INVITE message sent by the CPM Client A at the sending end carries list information of each receiver in the target group; when the target group is a Pre-defined group, the value of the header field Request-URI (Universal Resource Identifier) in the first SIP INVITE message sent by the CPM Client A at the sending end is the address of the Pre-defined group.

Step 102: The Participating Function A receives the first SIP INVITE message, processes the received message as a Back-to-Back User Agent (B2BUA) to generate and send a second SIP INVITE message, wherein the second SIP INVITE message carries a SDP message used for session negotiation and the SDP message reserves information about the size and content type of the first SIP INVITE message. The second SIP INVITE message is routed to the CPM Control Function X through a SIP/IP core network.

The SDP message in the second SIP INVITE message may carry MSRP connection parameters of the Participating Function A;

when the first SIP INVITE message carries list information of each receiver in the Ad-hoc group, the second SIP INVITE message reserves the list information of the receivers; when the value of the header field Request-URI of the first SIP INVITE message is the address of the Pre-defined group, the value of the header field Request-URI of the second SIP INVITE message reserves the address of the Pre-defined group.

Step 103: The CPM Control Function X receives the second SIP INVITE message, processes the received message as a B2BUA when determining that there is a non-CPM system receiver in receivers, so as to generate and send a third SIP INVITE message, wherein the third SIP INVITE message carries a SDP message used for session negotiation. The third SIP INVITE message is routed to the Inter-working Selection Function A through a SIP/IP core network.

The SDP message in the third SIP INVITE message may carry MSRP connection parameters of the CPM Control Function X.

The process of judging whether there is a non-CPM system receiver in receivers specifically comprises: if the target group is an Ad-hoc group, the CPM Control Function X judges one by one whether there is a non-CPM system receiver according to the address information of each receiver in the list information by analyzing the list information of each receiver in the target group carried by the received second SIP INVITE message; if the target group is a Pre-defined group, the CPM Control Function X acquires the address information of each receiver in the Pre-defined group according to the address of the Pre-defined group carried in the received second SIP INVITE message and judges one by one whether there is a non-CPM system receiver according to the address information of the receivers.

Step 104: The Inter-working Selection Function A receives the third SIP INVITE message, selects an inter-working function entity according to the parameter information in the message, such as content type, size and the like, and assumes that the selected inter-working function entity is Inter-working Function A, and then sends a fourth SIP INVITE message, wherein the fourth SIP INVITE message reserves the SDP message in the third SIP INVITE message and is routed to the Inter-working Function A through a SIP/IP core network.

The network selection function entity can forward the received SIP message as a SIP gateway, and the fourth and third SIP INVITE messages here are essentially the same messages.

Step 105: The Inter-working Function A receives the fourth SIP INVITE message and generates and sends a fourth 200 OK message (a success response message), wherein the response message is routed to the Inter-working Selection Function A through a SIP/IP core network and carries an SDP response message for session negotiation.

The SDP message in the fourth 200 OK message may carry MSRP connection parameters of the Inter-working Function A.

An inter-working function entity can be regarded as a SIP User Agent Server (UAS).

Step 106: The Inter-working Selection Function A receives the fourth 200 OK message and sends a third 200 OK message, wherein the third 200 OK message is routed to the CPM Control Function X through a SIP/IP core network and reserves the SDP message in the fourth 200 OK message.

The network selection function entity can forward the received SIP message as a SIP gateway, and the fourth and third 200 OK messages here are essentially the same messages.

Step 107: The CPM Control Function X receives the third 200 OK message, processes the received message as a B2BUA to generate and send a second 200 OK message. The second 200 OK message is routed to the Participating Function A through a SIP/IP core network and carries a SDP message used for session negotiation.

The SDP message in the second 200 OK message may carry the MSRP connection parameters of the CPM Control Function X.

In this step, the CPM control function entity may generate and send the second 200 OK message when receiving a first 200 OK message from a target end, wherein the first 200 OK message from a target end may be sent from the Inter-working Selection Function A or other participating function entities at the target end, i.e., from internal receivers in the CPM system in a group.

In this step, the CPM Control Function X may create a third MSRP link between itself and the Inter-working Function A according to the MSRP connection parameters of the Inter-working Function A.

Step 108: The Participating Function A receives the second 200 OK message, processes the received message as a B2BUA to generate and send a first 200 OK message. The first 200 OK message is routed to the CPM Client A through a SIP/IP core network and carries a SDP message used for session negotiation.

The SDP message in the first 200 OK message may carry the MSRP connection parameters of the Participating Function A.

In this step, the Participating Function A may create a second MSRP link between itself and the CPM Control Function X according to the MSRP connection parameters of the CPM Control Function X.

Step 109: The CPM Client A sends a first SIP ACK message after receiving the first 200 OK message, wherein the first SIP ACK message is routed to the Participating Function A through a SIP/IP core network.

In this step, the CPM Client A may create a first MSRP link between itself and the Participating Function A according to the MSRP connection parameters of the Participating Function A.

Step 110: The Participating Function A sends a second SIP ACK message after receiving the first SIP ACK message, wherein the second SIP ACK message is routed to the CPM Control Function X through a SIP/IP core network.

Step 111: The CPM Control Function X sends a third SIP ACK message after receiving the second SIP ACK message, wherein the third SIP ACK message is routed to the Inter-working Selection Function A through a SIP/IP core network.

In this step, considering that there are multiple receivers in a CPM system and a non-CPM system, the CPM Control Function X will not send the third SIP ACK message routed through a SIP/IP core network to the Inter-working Selection Function A unless receiving the third 200 OK message from the Inter-working Selection Function A before receiving the second SIP ACK message; if failing to receive the third 200 OK message from the Inter-working Selection Function A before receiving the second SIP ACK message, the CPM Control Function X will not send the third SIP ACK message to the Inter-working Selection Function A through a SIP/IP core network until receiving the third 200 OK message sent by the Inter-working Selection Function A.

Step 112: The Inter-working Selection Function A sends a fourth SIP ACK message after receiving the third SIP ACK message, wherein the fourth SIP ACK message is routed to the Inter-working Function A through a SIP/IP core network.

The network selection function entity can forward the received SIP message as a SIP gateway, and the fourth and third SIP ACK messages are essentially the same messages.

Step 113: The CPM Client A sends a first MSRP SEND (a media transmission request) through the first MSRP link, wherein the first MSRP SEND is a MSRP SEND between the CPM Client A and the Participating Function A and carries MSRP connection parameters of each transmission entity.

This step may be executed after the creation of the first MSRP link is finished.

Step 114: The Participating Function A performs relay transmission on media data in the received first MSRP SEND through the second MSRP link, i.e., sending a second MSRP SEND which is a MSRP SEND between the Participating Function A and the CPM Control Function X and carries MSRP connection parameters of each transmission entity.

Step 115: The CPM Control Function X performs relay transmission on media data in the received second MSRP SEND through the third MSRP link, i.e., sending a third MSRP SEND which is a MSRP SEND between the CPM Control Function X and the Inter-working Function A.

In this step, the control function entity serves as a MSRP Switch, to perform relay transmission on the media data received from the second MSRP link to each member in a group based on each created MSRP link which is connected with the control function entity. The invention is intended to explain that perform relay transmission on the media data based on the third media MSRP link to a non-CPM system member in a group.

Step 116: After receiving all the contents of the large message mode CPM message sent from the CPM Control Function X, the Inter-working Function A performs protocol conversion on the received contents to make them comply with the protocol format of non-CPM system B and then sends them to non-CPM system B;

Step 117: The non-CPM system B receives the contents subjected to the protocol conversion from the Inter-working Function A and returns a receiving acknowledgement message to the Inter-working Function A.

Step 118: The Inter-working Function A receives the acknowledgement message from the non-CPM system B, performs protocol conversion on the acknowledgement message and then generates and sends a MSRP response message which is transmitted to the CPM Control Function X through the third MSRP link.

Step 119: The CPM Control Function X receives the acknowledgement message and sends it to the Participating Function A through the second MSRP link.

Step 120: The Participating Function A sends the receiving acknowledgement message to the CPM Client A through the first MSRP link.

After the transmission of all the contents of the large message mode CPM message is finished, the CPM Client A sends an SIP BYE (a session ending message) indicative of the session ending of the large message mode CPM message after receiving the receiving acknowledgement message, the SIP BYE being routed to the Participating Function A through a SIP/IP core network; the Participating Function A sends the session ending message after receiving it, the session ending message being routed to the CPM Control Function X through a SIP/IP core network; the CPM Control Function X sends the session ending message to each receiver in the group after receiving the session ending message; for a non-CPM system receiver, the session ending message is sent to the Inter-working Function A through the Inter-working Selection Function A; or, the Inter-working Function A sends the session ending message after receiving a MSRP response message, the CPM Control Function X and the Participating Function A sends the session ending message after receiving it respectively, and the session ending message is routed to the CPM Client A through a SIP/IP core network.

In the embodiment, the Participating Function A sends the second SIP ACK message after receiving the first SIP ACK message. It should be additionally explained that the Participating Function A may send the second SIP ACK message after receiving the second 200 OK message without need of receiving the first SIP ACK message; similarly, the CPM Control Function X may send the third SIP ACK message after receiving the third 200 OK message without need of receiving the second SIP ACK message.

In the embodiment, the SIP ACK messages sent by each network function entity (such as the Participating Function A and the CPM Control Function X) may be those created by the network function entity or those directly forwarded after being received by the network function entity, which is not limited by the invention.

In the embodiment, the Participating Function A may create the second MSRP link after receiving the first SIP ACK message; and the CPM Control Function X may create the third MSRP link after receiving the second SIP ACK message.

In the embodiment, the first MSRP link may also be created by the Participating Function A, here, it is required that the first SIP INVITE message carries the MSRP connection parameters of the CPM Client A, and the Participating Function A may also create the first MSRP link according to the MSRP connection parameters of the CPM Client A after receiving the first SIP ACK message.

The second MSRP link may also be created by the CPM Control Function X, here, it is required that the second SIP INVITE message carries the MSRP connection parameters of the Participating Function A, and the CPM Control Function X may also create the second MSRP link according to the MSRP connection parameter of the Participating Function A after receiving the second SIP ACK message.

The third MSRP link may also be created by the Inter-working Function A, here, it is required that the third and fourth SIP INVITE messages carry the MSRP connection parameters of the CPM Control Function X, and the Inter-working Function A may create the third MSRP link according to the MSRP connection parameters of the CPM Control Function X after receiving the fourth SIP ACK message.

In the embodiment, the Participating Function A may create the second MSRP link after receiving the first MSRP SEND if it is the creator of the second MSRP link; and the CPM Control Function X may create the third MSRP link after receiving the second MSRP SEND if it is the creator of the third MSRP link.

To create the first, second and third MSRP links, a creator may actively initiate a link creation request according to MSRP connection parameters of an opposite end or select an existing MSRP link with a matched host, port and/or MSRP URI as the MSRP link.

In the embodiment, the inter-working entity A may return a MSRP response message to the aspect of a source end (i.e., the CPM control function entity) immediately along a media transmission path after the transmission of the MSRP media data is ended, or return the MSRP response message to the aspect of the source end (i.e., the CPM control function entity) after receiving an acknowledgement message from a non-CPM system as described in the embodiment.

It should be noted that the above-mentioned MSRP information refers to communications information related to MSRP, such as MSRP connection parameters which may comprise an IP address, a port number and/or an URI and the like.

In addition, in FIG. 1, except the non-CPM system B, the client and any two of the function entities may be connected in any one of the following three manners when actually applied:

manner 1: all the function entities of said function entities are connected with each other through a SIP/IP core network;

manner 2: partial function entities of said function entities are connected with each other through a SIP/IP core network, and other function entities except the partial ones are connected with one another directly or through other relay equipment except a SIP/IP core network; and manner 3: all the function entities of said function entities are connected with one another directly or through other relay equipment except a SIP/IP core network.

It can be seen that, if the above-mentioned different connection manners are adopted, in FIG. 1, except the non-CPM system B, the client and any two of the function entities communicate with one another in any one of the following three manners:

manner 1: all the function entities of said function entities communicate with one another through a SIP/IP core network;

manner 2: partial function entities of said function entities communicate with one another through a SIP/IP core network, and other function entities except the partial ones communicate with one another based on direct communication link between each other or through other relay equipment; and manner 3: all the function entities of said function entities communicate with one another based on direct communication link between each other or through other relay equipment except a SIP/IP core network.

As described above, through the technical solution of the embodiment of the invention, for a non-CPM system receiver in a group, a transmission link between a sender and IWF is created through a session invite message of a large message mode CPM message, the contents of the large message mode CPM message are sent to the IWF which will forward the contents of the large message mode CPM message to a non-CPM client at a receiving end, so that the problem that a large message mode CPM message cannot be sent to a group in the prior art is solved and the user experience is improved.

The invention claimed is:

1. A method for transmitting a large message mode CPM (Converged IP Messaging) message, comprising: creating a MSRP (Message Session Relay Protocol) link respectively between a CPM client at a sending end and a participating function entity at a source end, between the participating function entity at the source end and a CPM control function entity, and between the CPM control function entity and an inter-working function entity before the CPM client sends a large message mode CPM message to a non-CPM system receiver in a target group, wherein a creator of each MSRP link acquires MSRP information of an opposite end through a media negotiation process and implements the creation of the MSRP link according to the MSRP information; then, sending contents of the large message mode CPM message by the CPM client at the sending end to the inter-working function entity through each created MSRP link sequentially; and sending the received contents of the large message mode CPM message by the inter-working function entity to the non-CPM system receiver after the inter-working function entity performs protocol conversion on the received contents, wherein the large message mode CPM message has a size of more than 1300 bytes, and cannot be carried within a Session Initiation Protocol (SIP) message.

2. The method according to claim 1, wherein the media negotiation process is: the CPM client at the sending end sends a first session invite message, and the participating function entity at the source end receives the first session invite message; the participating function entity at the source end generates and sends a second session invite message, and the CPM control function entity receives the second session invite message; for the non-CPM system receiver in the group, the CPM control function entity generates and sends a third session invite message, and a network selection function entity receives the third session invite message; the network selection function entity selects an inter-working function entity according to the third session invite message and sends a fourth session invite message, and the inter-working function entity receives the fourth session invite message;

the inter-working function entity generates and sends a fourth success response message, and the network selection function entity receives the fourth success response message; the network selection function entity sends a third success response message, and the CPM control function entity receives the third success response message; the CPM control function entity generates and sends a second success response message, and the participating function entity at the source end receives the second success response message; the participating function entity at the source end generates and sends a first success response message, and the CPM client at the sending end receives the first success response message.

3. The method according to claim 2, further comprising: generating and sending a first acknowledgement message by the CPM client at the sending end after the CPM client at the sending end receives the first success response message, receiving the first acknowledgement message by the participating function entity at the source end; sending a second acknowledgement message by the participating function entity at the source end after the participating function entity at the source end receives the first acknowledgement message, receiving the second acknowledgement message by the CPM control function entity; sending a third acknowledgement message by the CPM control function entity, receiving the third acknowledgement message by the network selection function entity; sending a fourth acknowledgement message by the network selection function entity after the network selection function entity receives the third acknowledgement message, receiving the fourth acknowledgement message by the inter-working function entity; or, sending a third acknowledgement message by the CPM control function entity after the CPM control function entity receives a third success response message, receiving the third acknowledgement message by the network selection function entity; sending a second acknowledgement message by the participating function entity at the source end after the participating function entity at the source end receives a second success response message, receiving the second acknowledgement message by the CPM control function entity; generating and sending a first acknowledgement message by the CPM client at the sending end after the CPM client at the sending end receives a first success response message, receiving the first acknowledgement message by the participating function entity at the source end.

4. The method according to claim 2, wherein the MSRP link between the participating function entity at the source end and the CPM client at the sending end is a first MSRP link;
the first session invite message contains MSRP information of the CPM client at the sending end, then the process of creating the first MSRP link is: the participating function entity at the source end creates the first MSRP link according to the MSRP information of the CPM client at the sending end;
or, the first success response message contains MSRP information of the participating function entity at the source end, then the process of creating the first MSRP link is: the CPM client at the sending end creates the first MSRP link according to the MSRP information of the participating function entity at the source end.

5. The method according to claim 4, wherein the MSRP link between the CPM control function entity and the participating function entity at the source end is a second MSRP link;
the second session invite message contains MSRP information of the participating function entity at the source end, then the process of creating the second MSRP link is: the CPM control function entity creates the second MSRP link according to the MSRP information of the participating function entity at the source end;
or, the second success response message contains MSRP information of the CPM control function entity, then the process of creating the second MSRP link is: the participating function entity at the source end creates the second MSRP link according to the MSRP information of the CPM control function entity.

6. The method according to claim 5, wherein the MSRP link between the inter-working function entity and the CPM control function entity is a third MSRP link;
the third and fourth session invite messages contain MSRP information of the CPM control function entity, then the process of creating the third MSRP link is: the inter-working function entity creates the third MSRP link according to the MSRP information of the CPM control function entity;
or, the third and fourth success response messages contain MSRP information of the inter-working function entity, then the process of creating the third MSRP link is: the CPM control function entity creates the third MSRP link according to the MSRP information of the inter-working function entity.

7. The method according to claim 4, wherein
if the creator of the first MSRP link is the CPM client at the sending end, the time to create the first MSRP link by the CPM client at the sending end is: after receiving the first success response message;
and if the creator of the first MSRP link is the participating function entity at the source end, the time to create the first MSRP link by the participating function entity at the source end is: after receiving the first acknowledgement message.

8. The method according to claim 5, wherein
if the creator of the second MSRP link is the participating function entity at the source end, the time to create the second MSRP link by the participating function entity at the source end is: after receiving the second success response message, or the first acknowledgement message or a MSRP media transmission request;
and if the creator of the second MSRP link is the CPM control function entity, the time to create the second MSRP link by the CPM control function entity is: after receiving the second acknowledgement message.

9. The method according to claim 6, wherein
if the creator of the third MSRP link is the CPM control function entity, the time to create the third MSRP link by the CPM control function entity is: after receiving the third success response message, or the second acknowledgement message or a MSRP media transmission request;
and if the creator of the third MSRP link is the inter-working function entity, the time to create the third MSRP link by the inter-working function entity is: after receiving the fourth acknowledgement message.

10. The method according to claim 6, wherein
between the processes of creating the first and second MSRP links, further comprising:
sending a first media transmission request by the CPM client at the sending end, receiving the first media transmission request by the participating function entity at the source end;
the MSRP information of the CPM control function entity is acquired from the second success response message or path header information contained in the first media transmission request;
between the processes of creating the second and third MSRP links, further comprising:
sending a second media transmission request by the participating function entity at the source end, receiving the second media transmission request by the CPM control function entity;
the MSRP information of the inter-working function entity is acquired from the third success response message or path header information contained in the second media transmission request.

11. The method according to claim 1, further comprising:
returning a receiving acknowledgement message by the non-CPM system receiver to the inter-working function entity after the non-CPM system receiver receives the contents of the large message mode CPM message which were subjected to protocol conversion; and sending a MSRP response message by the inter-working function entity to the CPM control function entity after the inter-working function entity receives the receiving acknowledgement message.

12. The method according to claim 1, wherein the process of creating a MSRP link comprises:
a creator implements the creation by initiating a link creation request according to MSRP information of an opposite end;
or, a creator selects an existing MSRP link with a matched host, port and/or MSRP URI as a MSRP link to be created.

13. The method according to claim 1, wherein any two of the function entities comprising CPM client at the sending end, the participating function entity at the source end, the CPM control function entity and the inter-working function entity communicate with each other in any one of the following three manners:
manner 1: all the function entities of said function entities communicate with each other through a SIP/IP core network;
manner 2: partial function entities of said function entities communicate with each other through a SIP/IP core network, and other function entities except the partial ones communicate with one another based on direct communication link between each other or through other relay equipment except a SIP/IP core network; and manner 3: all the function entities of said function entities communicate with one another based on direct communication link between each other or through other relay equipment except a SIP/IP core network.

14. A system for transmitting a large message mode CPM (Converged IP Messaging) message, comprising a CPM client at a sending end, a participating function entity at a source end, a CPM control function entity and an inter-working function entity, wherein each of the function entities above is arranged for acquiring MSRP (Message Session Relay Protocol) information of an opposite end used for creating a MSRP link through a media negotiation process and creating a MSRP link respectively between the CPM client at the sending end and the participating function entity at the source end, between the participating function entity at the source end and the CPM control function entity, and between the CPM control function entity and the inter-working function entity according to the MSRP information;

the CPM client at the sending end is further arranged for sending contents of a large message mode CPM message to the inter-working function entity through each of the created MSRP links sequentially;

and the inter-working function entity is further arranged for sending the received contents of the large message mode CPM message which were subjected to protocol conversion to a non-CPM system receiver;

wherein the large message mode CPM message has a size of more than 1300 bytes, and cannot be carried within a Session Initiation Protocol (SIP) message.

15. The system according to claim 14, wherein among any two of function entities comprising the CPM client at the sending end, the participating function entity at the source end, the CPM control function entity and the inter-working function entity, there is a connection manner in any one of the following three manners:

manner 1: all the function entities of said function entities are connected with each other through a SIP/IP core network;

manner 2: partial function entities of said function entities are connected with each other through a SIP/IP core network, and other function entities except the partial ones are connected with one another directly or through other relay equipment except a SIP/IP core network; and manner 3: all the functional entities of said function entities are connected with one another directly or through other relay equipment except a SIP/IP core network.

16. The method according to claim 5, wherein if the creator of the first MSRP link is the CPM client at the sending end, the time to create the first MSRP link by the CPM client at the sending end is: after receiving the first success response message;

and if the creator of the first MSRP link is the participating function entity at the source end, the time to create the first MSRP link by the participating function entity at the source end is: after receiving the first acknowledgement message.

17. The method according to claim 6, wherein if the creator of the first MSRP link is the CPM client at the sending end, the time to create the first MSRP link by the CPM client at the sending end is: after receiving the first success response message;

and if the creator of the first MSRP link is the participating function entity at the source end, the time to create the first MSRP link by the participating function entity at the source end is: after receiving the first acknowledgement message.

18. The method according to claim 6, wherein if the creator of the second MSRP link is the participating function entity at the source end, the time to create the second MSRP link by the participating function entity at the source end is: after receiving the second success response message, or the first acknowledgement message or a MSRP media transmission request;

and if the creator of the second MSRP link is the CPM control function entity, the time to create the second MSRP link by the CPM control function entity is: after receiving the second acknowledgement message.

* * * * *